(No Model.) 2 Sheets—Sheet 1.

W. D. GRAY.
BOLTING REEL.

No. 393,826. Patented Dec. 4, 1888.

Attest:
Sidney P. Hollingsworth
W. R. Kennedy.

Inventor:
W. D. Gray,
By his Atty
Phil T. Dodge

W. D. GRAY.
BOLTING REEL.

No. 393,826. Patented Dec. 4, 1888.

ON LINE X—X

UNITED STATES PATENT OFFICE.

WILLIAM D. GRAY, OF MILWAUKEE, WISCONSIN, ASSIGNOR TO E. P. ALLIS & COMPANY, OF SAME PLACE.

BOLTING-REEL.

SPECIFICATION forming part of Letters Patent No. 393,826, dated December 4, 1888.

Application filed April 28, 1887. Serial No. 236,477. (No model.)

*To all whom it may concern:*

Be it known that I, WILLIAM D. GRAY, of Milwaukee, in the county of Milwaukee and State of Wisconsin, have invented certain Improvements in Bolting-Reels, of which the following is a specification.

The invention relates to that class of flour-dressing machines in which the separator proper is a horizontal or slightly-inclined reel; and the invention consists in the peculiar construction and combination of the reel and internal cylinder and intermediate lifting-buckets, as hereinafter explained in detail.

Figure 1:
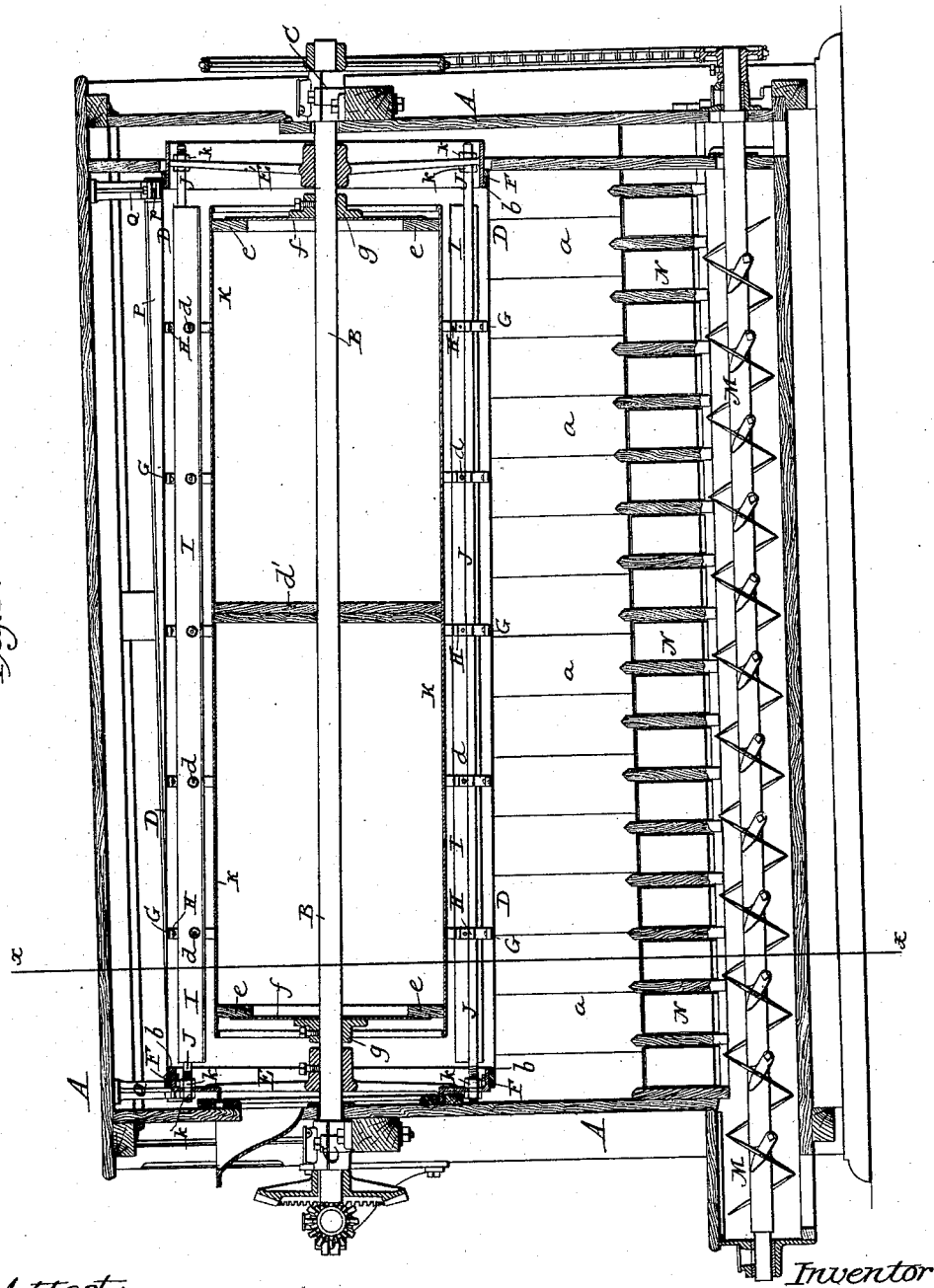
Figure 2:
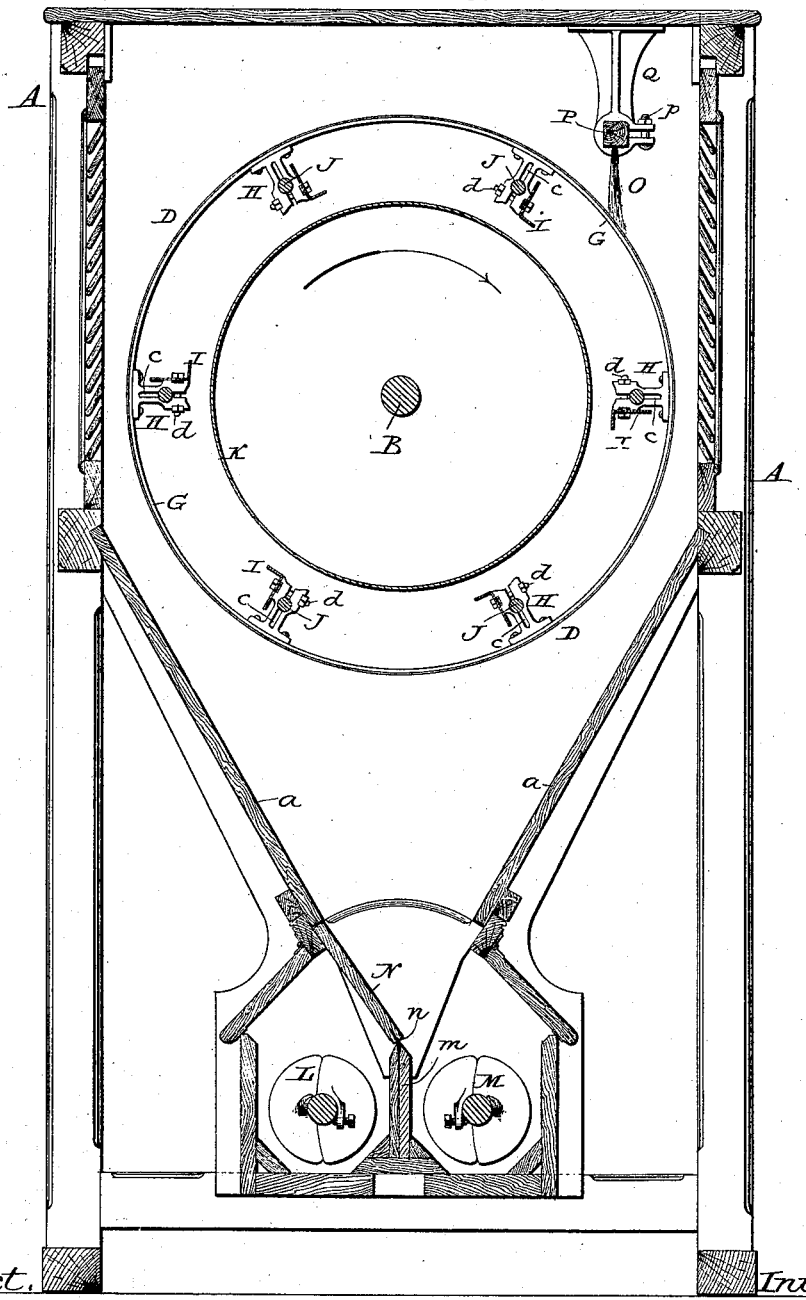

In the accompanying drawings, Figure 1 represents a longitudinal vertical section through the center of my improved machine. Fig. 2 is a cross-section of the same on the line $x\ x$.

Referring to the drawings, A represents an external chest or casing constructed in any appropriate form and manner, with the usual converging walls, $a$, at the base to direct the material to the center.

B represents the main shaft extending through the upper part of the chest from end to end and seated in suitable boxes or bearings, C.

D represents a cylindrical reel supported and carried at its ends by the skeleton wheels E E, secured to the main shaft.

The reel is made of a cylindrical form and clothed externally from end to end with bolting-cloth or similar material. At its ends the cloth is attached to and sustained by wooden or other hoops, F, which encircle the two wheels or heads E E. As shown in the drawings, these wheels or heads are formed with peripheral flanges $b$, to bear against the inner edges of the hoops and keep the cloth properly strained in a longitudinal direction.

At intermediate points in its length the cloth is sustained by circular hoops G, of wood or other suitable material, which are in turn sustained by internal supporting-blocks, H, mounted on rods J, which latter are extended through the reel from end to end and seated at their extremities in the wheels E E. At one end these bolts are secured to the pulley forming the head of the reel by inside and outside nuts or equivalent fastening devices. They may be attached in like manner to the tail of the reel if the latter is of the fixed type.

The supporting-blocks are riveted at their outer ends to the hoops, bored transversely to receive the supporting-rods, and each provided with a slot, $c$, and a transverse bolt, $d$, to admit of its being contracted and clamped firmly upon the rod.

I I represent lifting buckets or blades extending longitudinally through the reel from one end to the other. As shown in the drawings, these blades are made of sheet metal, preferably steel, bent to an L form in cross-section, and secured to the side of the blocks H either by means of the bolts $d$ or otherwise.

It will be observed that a small space or opening extends longitudinally between the outer edge of each blade or bucket and the inner surface of the reel, so that the material under treatment may flow downward in a thin stream on the ascending side of the reel.

K represents a closed central cylinder constructed of wood, metal, or some other appropriate material, and preferably set slightly inward at the head to permit the admission of the material to the machine. This cylinder is formed of zinc, supported, as shown in the drawings, from the main shaft C at the middle by a tight web or partition, $d'$, and at the ends by external hoops, $e$, secured to the sheet-metal disks $f$, which are in turn fastened to collars $g$, bolted to the shaft. It is to be understood, however, that any other construction may be adopted.

The parts are proportioned and arranged, as shown, in such a manner as to leave between the inner edges of the blades and the drum spaces of a width substantially equal to those between the blades and the bolting-cloth, so that in the event of the machine being overloaded with stock it may descend on both sides of the ascending blades.

It will be observed that the material entering the head of the machine is confined during its passage therethrough to the narrow annular space which exists between the central cylinder and the surrounding reel, and that in passing longitudinally through this space it is subjected to the action of the blades or buckets I, whereby the material is lifted from the lower part of the screen and carried upward on the ascending side, where, flowing past the outer edge of the buckets, it descends in a thin stream over the upwardly-moving bolting-surface. By giving the machine a proper speed a portion of the material may be carried by the buckets upward over the top of the cylinder and discharged against the descending side of the cloth; but this is not ordinarily practiced.

At its base the machine is provided, as usual, with two longitudinal conveyers, L and M, working in suitable conveyer troughs or boxes, and with a series of divider boards or valves, N, hinged at their lower ends to the partition between the conveyers and arranged to swing at their upper ends from side to side, so as to direct the descending material to one or the other of the conveyers, as required. In their general arrangement these parts are identical with those now in common use; but in place of hinging the parts N in the ordinary manner I adopt the construction shown in Fig. 2, in which it will be seen that the board is seated at its lower edge on top of the partition and the latter brought to an edge, and the two connected by a strip of leather or similar flexible material, n, inserted into the edges of the board and the partition, respectively. The flexible material thus inserted forms a closed joint of such character that it is not liable to be clogged or impeded by the falling material, and which is without metallic surfaces to become corroded.

For the purpose of removing the adhering material from the outer surfaces of the reel and keeping its meshes clear, I make use of a longitudinal brush, O, attached to a rock-shaft, P, mounted at its ends in hangers or brackets Q, depending from the top of the chest to which they are bolted. These brackets are divided or slotted at the lower end where they encircle the journals of the rock-shaft, and are provided with contracting bolts p, whereby they are enabled to secure the rock-shaft and brush in different positions.

While I prefer to retain the details of construction herein described, it is to be understood that they may be modified within the range of mechanical skill, and particularly that the lifting blades or buckets may be modified in form and attached to the reel in any appropriate manner.

While it is preferred to secure the internal drum or cylinder to the shaft B, to revolve therewith, it will be seen that this is not necessary and that it may be left free, and, if desired, suitably fixed to prevent its rotation.

Having thus described my invention, what I claim is—

1. The combination of a cylindrical reel having an uninterrupted bolting-surface, a concentric imperforate cylindrical drum therein, and a series of intermediate longitudinal blades secured rigidly in place to revolve with the reel, their outer edges slightly separated from the bolting-surface and their inner edges turned in the direction of rotation to retain the material.

2. The combination of a rotary reel, a central imperforate drum connected thereto and revolving therewith, and lifting blades or buckets connected to and revolving with the reel, their outer edges separated from the reel-surface to leave the space for the passage of the material, as described.

3. The central shaft and the reel-heads fixed thereon, in combination with the longitudinal rods J, passed through and sustained by said heads, the divided blocks H, mounted on the rods and provided with contracting bolts, the bolting-cloth, the sustaining-hoops supported by the blocks, and the longitudinal blades I, also sustained by the blocks, as shown.

In testimony whereof I hereunto set my hand, this 14th day of April, 1887, in the presence of two attesting witnesses.

WM. D. GRAY.

Witnesses:
R. BIRKHOLZ,
F. A. HALL.